June 25, 1946.  A. J. GAVALIS  2,402,883
COOKING UTENSIL
Filed Aug. 22, 1944    2 Sheets-Sheet 1
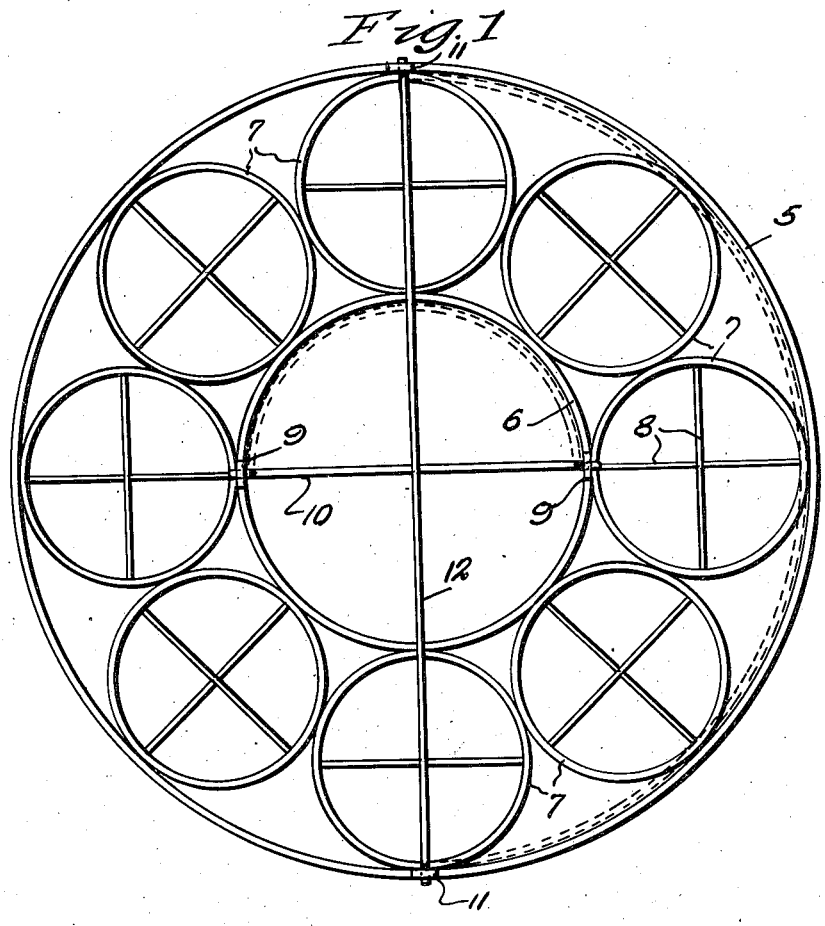
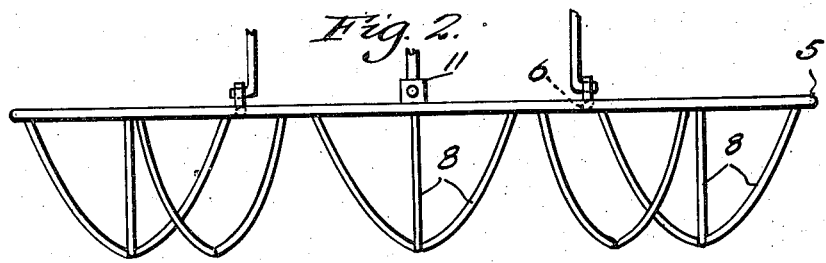
Inventor
ALGERD J. GAVALIS,
By *Clarence A. O'Brien and Harvey B. Jacobson*
Attorneys Patented June 25, 1946

2,402,883

UNITED STATES PATENT OFFICE 2,402,883

COOKING UTENSIL

Algerd J. Gavalis, Oak Park, Ill.

Application August 22, 1944, Serial No. 550,643

1 Claim. (Cl. 99—440)

This invention appertains to new and useful improvements in cooking utensils, and more particularly to a rack for holding eggs while boiling.

The principal object of the present invention is to provide a rack in which a plurality of eggs can be set in a convenient position and there remain while being boiled.

Another important object of the invention is to provide an egg rack for conveniently placing and removing eggs in boiling water.

Other objects and advantages of the invention will become apparent to the reader of the following description.

In the drawings:

Figure 1 represents a top plan view of the rack.

Figure 2 is a cross sectional view through the rack with the handles removed.

Figure 3:
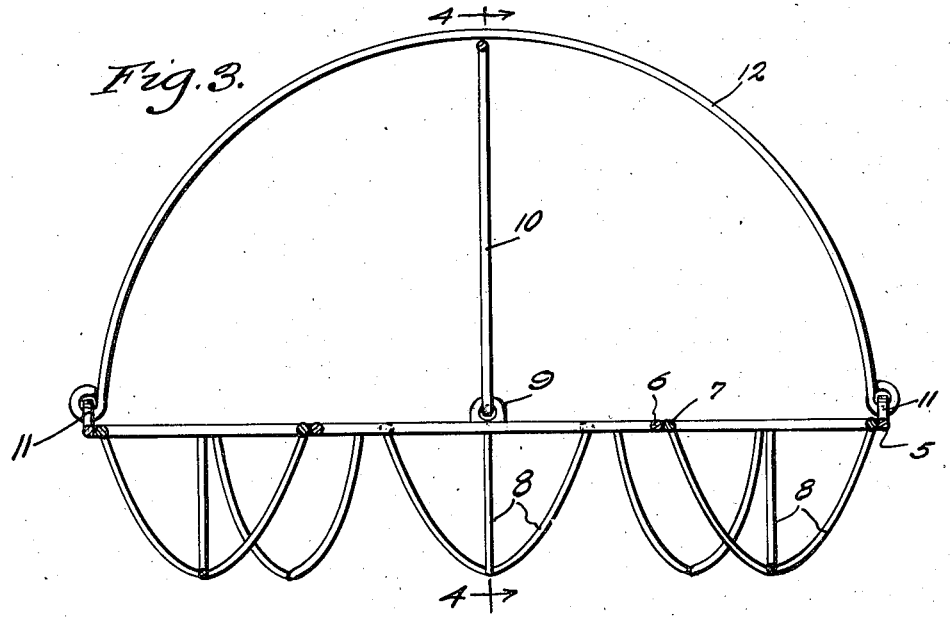
Figure 3 is a cross sectional view through the rack showing the handles in raised position.
Figure 4:
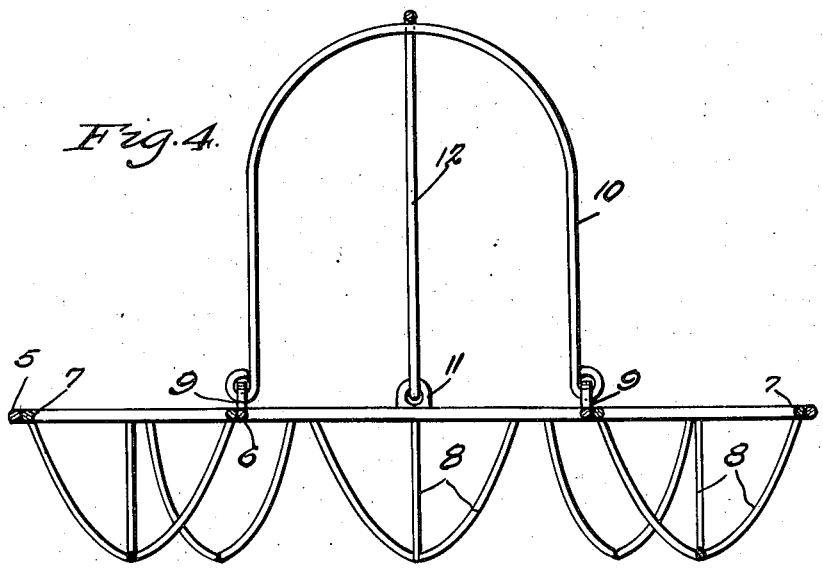
Figure 4 is a cross sectional view through the rack taken substantially on the line 4—4 of Figure 3 showing the handles in elevated position.

Referring to the drawings wherein like numerals designate like parts, it can be seen that the rack is made up of an outer annulus 5 and a spaced inner annulus 6. Between the annulus 5 and the annulus 6 is a plurality of egg receiving nests, each consists of an annulus 7 and a pair of crossed depending substantially U-shaped web members 8, 8. Obviously, the annular members 7 can be welded or soldered together and, of course, the annular members 5, 6 can be welded or soldered to the annular members 7 of the egg nests.

Rising from ears 9 on the inner annulus 6 is a narrow U-shaped swingable bail 10 while swingably secured to upstanding ears 11 on the annulus 5 is a wider U-shaped bail 12. These bails are of such a dimension that the larger outer bail 12 will frictionally bind against the uppermost portion of the smaller bail 10 when the latter is in elevation to the end that both bails will remain erect and this is desirable when boiling eggs so that the bails will be out of the water and will not be too hot at any time to handle.

Obviously, another nest may be placed within the annulus 6. As a matter of fact, the annulus 6 may be made large enough so that a plurality of the egg receiving nests can be arranged therein.

While foregoing specification sets forth the invention in specific terms, it is to be understood that numerous changes in the shape, size and materials may be restorted to without departing from the spirit and scope of the invention as claimed hereinafter.

Having described the invention, what is claimed as new is:

An egg rack for boiling eggs comprising an outer annulus, an inner annulus, and open structure egg receiving units secured to and interposed between said annuli, a swingable bail handle for the outer annulus, a swingable bail handle for the inner annulus, said handles being disposed at right angles to each other, one of said handles being operative on the outside of the other and adapted to be brought into frictional engagement with said other handle for the purpose of maintaining said handles in upright position, said handles having frictionally engaging high points formed in a constant arc respectively.

ALGERD J. GAVALIS.